United States Patent [19]
Daniels

[11] 4,164,964
[45] Aug. 21, 1979

[54] FLUID DISPENSER FOR RECONSTITUTING BEVERAGES AND THE LIKE

[75] Inventor: Paul J. Daniels, Sarasota, Fla.

[73] Assignees: Shirley D. Alderman, Signal Mountain, Tenn.; Joyce D. Hendrix, South Wilmette, Ill. ; part interest to each

[21] Appl. No.: 847,181

[22] Filed: Oct. 31, 1977

[51] Int. Cl.² .............................................. B65B 3/34
[52] U.S. Cl. ................................. 141/329; 99/302 R; 141/372; 215/228
[58] Field of Search .................... 141/19, 329, 330, 69, 141/70, 370–373, 1, 11, 82, 98, 250–284; 99/282, 283, 295, 302 R, 357; 222/83, 83.5, 86; 426/394, 113, 402, 403; 211/71, 74; 215/100 R, 228

[56] References Cited
U.S. PATENT DOCUMENTS

| | | | |
|---|---|---|---|
| 3,365,068 | 1/1968 | Crosby | 211/74 |
| 4,051,879 | 10/1977 | Itagaki | 141/329 |

Primary Examiner—Houston S. Bell, Jr.
Attorney, Agent, or Firm—Ralph G. Hohenfeldt

[57] ABSTRACT

A device for reconstituting beverages by injecting fluid such as hot or cold water into a container having a granulated, powder or liquid food or beverage concentrate material therein comprises an electroresponsive valve coupled to a fluid supply, a combination nozzle and punch coupled to the valve outlet with a flexible tube, electroresponsive means for advancing the punch to penetrate the container and means for supporting the container so there will be an angle between the flow path of the fluid discharged from the nozzle and the axis or walls of the container during filling. Electric control circuitry is provided for timing the valve, punch and nozzle operations and for issuing a measured quantity of fluid to the container. Containers adapted for being easily penetrated by the punch, for sanitary sealing and for being engaged in a self-supporting state during filling are also provided.

28 Claims, 10 Drawing Figures

FLUID DISPENSER FOR RECONSTITUTING BEVERAGES AND THE LIKE

BACKGROUND OF THE INVENTION

This invention relates to a machine for dispensing a measured quantity of fluid to a container in which there are granules, powder or liquids constituting food or beverage concentrate materials which are to be reconstituted by dissolving them, respectively, in the water.

Devices of this general class are well known for dispensing reconstituted coffee, sweet drinks, soups and the like into containers in which the concentrated material is sealed. In prior devices, it is customary to actuate a sharpened punch which perforates the container to provide access for a separate filler tube through which the water is injected. One of the problems with prior dispensing devices is that adequate mixing of the fluid and concentrated material is not obtained during the sort interval during which the fluid is being injected. As a result, the user must often open the container and stir it or shake it to agitate its contents for thorough mixing. The mixing problem is more noticeable in connection with reconstituting soup and other more viscous and thick solutions.

Another problem in prior dispensing devices is their complexity which is accentuated by the requirement that there be devices for driving a punch and a filler spout or nozzle independently so there are two parts which penetrate the container that must be kept clean and otherwise maintained.

Another problem with prior devices is that the cup, bottle or other container which is to be filled is often not held in a fixed and stable condition during the filling operation. Usually, the container is just dropped by some mechanical means onto an open platform for the filling operation. Holding a container stable is especially desirable when the container must be punched before it can be filled.

There are known types of fluid dispensers which use a sharp tipped nozzle that penetrates a container and admits fluid to it. U.S. Pat. No. 2,939,381 to McBride and U.S. Pat. No. 3,340,671 to Loo are examples. Neither of these patents, however, disclose any means for producing turbulence in a container during filling, nor do they show the means for gripping and holding the container by its cover as taught herein, nor do they disclose container covers or caps which are especially adapted for being positively gripped nor other features of the new dispenser.

SUMMARY OF THE INVENTION

An object of the present invention is to provide a machine for dispensing fluid into a container wherein the filling nozzle is so disposed relative to the container to be filled that substantial turbulence is produced for enhancing mixing of the fluid and reconstituted material.

A further object is to provide a machine having means for positively engaging and maintaining the container to be filled in a stable condition during the entire filling operation.

Still another object of the invention is to provide containers which are especially adapted for being engaged and held in a stabilized condition in cooperating with the machine.

Still other objects of the invention are to provide a dispensing machine which has means for assuring that the container to be filled is in a predetermined position before the fluid filling operation can be initiated.

Yet another object is to provide a simplified means for assuring that punching, filling, termination of filling, withdrawal of the nozzle and safe removal of the container will all occur in the proper sequence.

In general terms, the new dispenser employs an electroresponsive valve which has its input port coupled with a hot or cold water supply and its output port coupled with a flexible hose to a combination container punch and filler nozzle. Electroresponsive means are provided for advancing the punch into the container and for retracting the punch after the container has been filled. Means are provided for supporting the container so that there is an angle between the side walls or axis of the container and the line on which the fluid is projected from the punch nozzle so that a fluid circulatory action, turbulence and good mixing of the fluid and reconstitutable material is obtained. The covers of the containers have deformable ridges which are inserted between holder runners on the machine that crease or indent the ridges to thereby secure the container during filling. The ridges or protuberances also act on a concealed switch to initiate a machine operating cycle when a container is inserted.

How the foregoing and other more specific objects of the invention are achieved will appear in the ensuing more detailed description of a preferred embodiment of the invention which will now be set forth in reference to the drawings.

DESCRIPTION OF A PREFERRED EMBODIMENT

Figure 1:
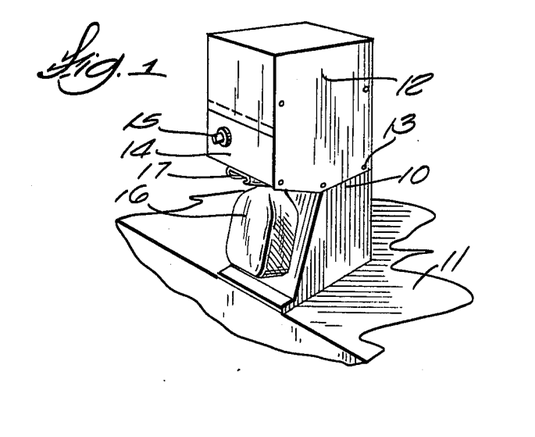
FIG. 1 is a perspective view of one embodiment of the dispensing machine with a bottle positioned therein for filling.

In FIG. 1, one version of the dispensing machine is seen to comprise a base 10 which may be mounted on a tabletop 11. A removable housing 12 is secured on the base with screws such as those marked 13. The housing is desirably formed of noncorroding material such as stainless steel or plastic. The front of the housing overlaps an upstanding wall 14 in which a control push button 15 is mounted. As illustrated in FIG. 1, a container such as a bottle 16 is positioned for being filled with hot or cold water, usually, to produce a reconstituted beverage or soup, for example, as the result of mixture of the water with suitable concentrated material held in the container. A holder member 17 for supporting container 16 during the filling operation is also evident in FIG. 1.

Figure 2:
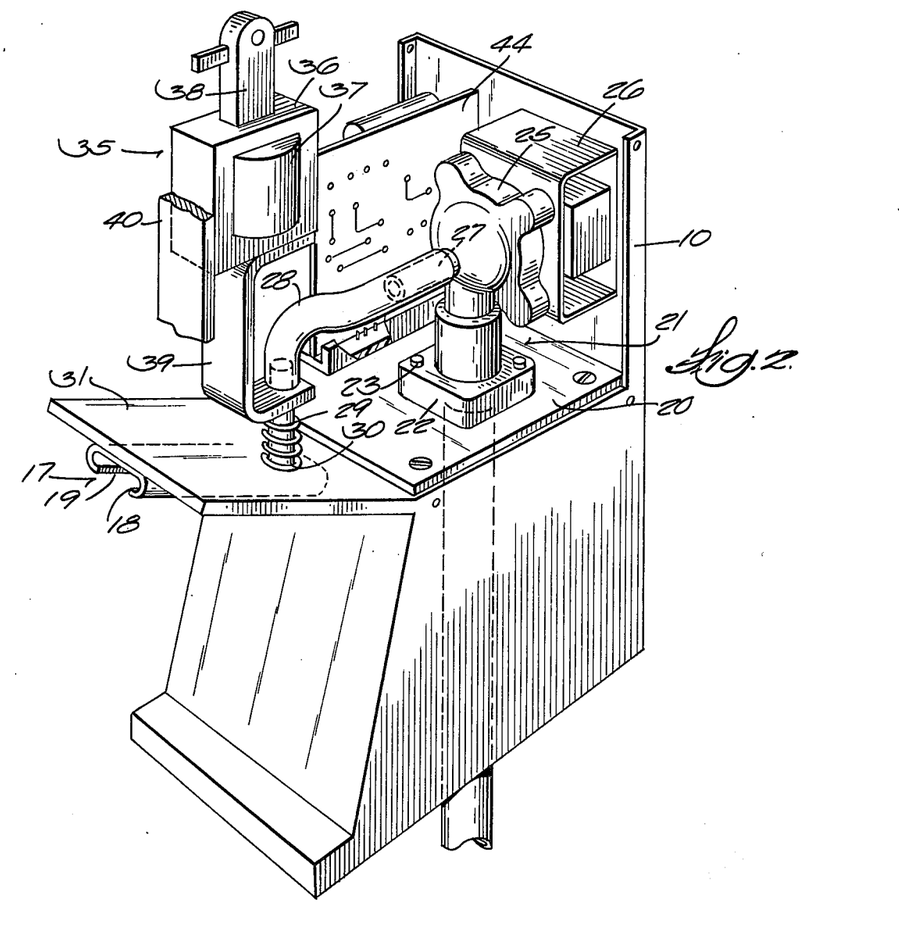
FIG. 2 is a perspective view of the machine shown in the preceding figure with its cover removed to show some of the essential mechanism.

FIG. 2 shows the machine with cover 12 and some other parts omitted to reveal essential components of the machine. The machine is seen to comprise a base plate 20 on which an electroresponsive valve assembly 21 is mounted. This may be a commercially available electrically actuated valve of a type which is commonly used in household clothes or dish washing machines. It comprises an adaptor 22 by which it may be mounted to base plate 20 with bolts such as the one marked 23. A pipe 24 is coupled with adaptor 22. This pipe may be connected to a source, not shown, of pressurized hot or cold water depending on whether the machine is to be used for making reconstituted hot or cold consumable mixtures. The valve shutoff elements are in body 25 of the assembly. An electromagnetic operator 26 is mounted to body 25. When electroresponsive operator 26 is electrically energized, valve 21 is opened to provide a flow path from its input pipe 24 to its output port which constitutes a tubular extension 27 which is shown in hidden lines in FIG. 2. When operator 26 is de-energized, the valve closes.

Figure 3:
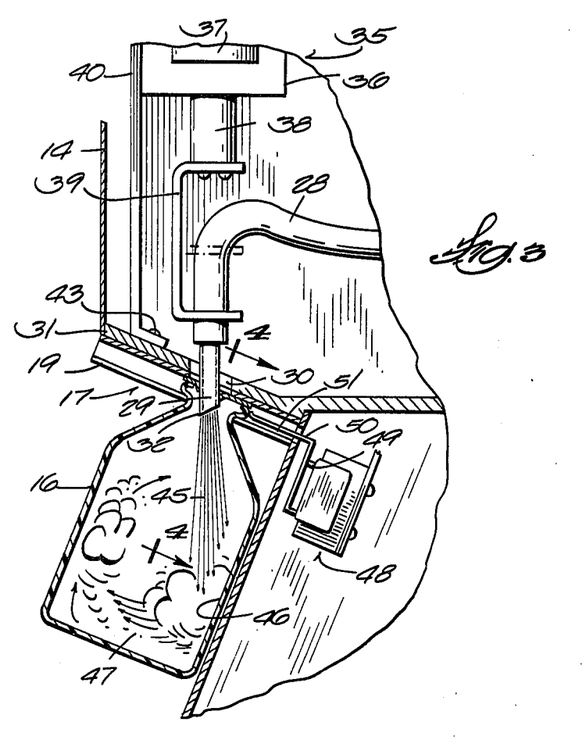
FIG. 3 is a fragmentary view of a part of the machine showing the relationship of the combination filler nozzle and punch of the machine and a bottle container during fluid filling.

A flexible hose 28 is used to couple output port 27 of the valve to a combination nozzle and punch device 29. The nozzle extends through an opening 30 which is in a bottom wall 31 forming part of the base. Bottom wall 31 is generally planar and is disposed at an acute angle with respect to horizontal. Holder 17 is mounted on the lower side of bottom wall 31 and it has a clearance opening for nozzle 29 corresponding with hole 30. In this embodiment, nozzle 29 is a metal tube, preferably of stainless steel or plastic, which has its lower end cut at a bias as can be seen in FIG. 3 to provide a sharp piercing tip 32. In this embodiment, the axis of the combination nozzle and piercing punch is vertical and the combination nozzle and punch is adapted for being advanced or lowered and retracted or raised along a vertical line. The axis of the nozzle, therefore, is not perpendicular to inclined planar member 31 nor to the plane of container holder or guide 17. The axis of the nozzle and the plane of the container holder are at an angle with each other for the purpose of promoting turbulence and good mixing of the fluid and reconstitutable material in the container during filling as will be explained in greater detail later.

The holder 17 has a pair of opposed turned in edges constituting runners 18 and 19 which are substantially parallel but converge slightly toward each other from the front to the rear of the holder 17. The neck or other suitable portion of a container can be slid in between these runners for engaging the container tightly during filling.

In FIG. 2, the means for advancing and retracting nozzle 29 is an electroresponsive solenoid operator 35. The operator includes a magnetic metal core 36 and a magnet coil 37 in which there is a plunger 38 that is attracted downwardly when a coil 37 is energized. Fastened to the lower end of plunger 38 is a U-shaped bracket 39 which engages and supports nozzle 29. Core 39 is fastened to a bracket 40 which is shown fragmentarily in FIG. 2 but is visible in profile in FIG. 3. Bracket 40 is secured to planar plate 31 with screws such as the one marked 43 in FIG. 3. Also mounted on the base in FIG. 2 is a printed circuit board 44 on which the electric components for controlling this embodiment of the machine are placed as will be discussed later.

FIG. 3 shows a plastic bottle 16 held in place free of human hands and undergoing the filling process. Thus, in FIG. 3, plunger 38 of operator 35 has been driven downwardly in response to coil 37 having been energized. The sharpened tip 32 of nozzle 29 has consequently penetrated the cap or top of container 16. The container is supported by holder 17 with its axis at an angle with respect to the vertical axis of tubular nozzle 29. A stream of fluid 45 is being projected from the nozzle by virtue of valve 21 now being open. It will be noted that the stream 45 is projected against the inside wall surface 46 of the container so the fluid impinges on the wall at an angle. The fluid then deflects off of the wall and has a circulating motion imparted to it to create turbulence as symbolized by the nebulous flow lines 47. This turbulence and circulation promotes substantially instantaneous mixing in the short interval during which fluid is projected into the container. Thus, when the container is slid off of the holder and guide 17, the reconstituted beverage or soup in the container will be thoroughly mixed and ready for consumption.

Note also in FIG. 3 that there is a mini-switch 48 mounted in the machine adjacent the container filling station. This switch has an actuating detent 49 adjacent a pivotal arm 50 which has a tip 51. When the upper portion of the bottle 16 strikes tip 51, switch 48 is actuated so as to enable operation of the machine. The filling sequence is initiated by pressing push button 15 in the front of the housing as in FIG. 1, but the sequence is disabled at any time that switch 48 is not actuated by the presence of a container in the holder. How these switches are involved in controlling the machine will be discussed in greater detail later in connection with FIG. 6.

Figure 4:
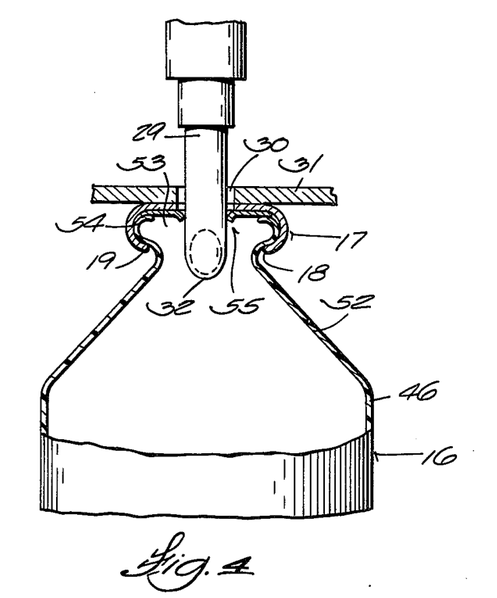
FIG. 4 is a section taken along a line corresponding with 4—4 in FIG. 3.

Some of the characteristics of a typical container, for being used with the FIGS. 1–4 embodiment of the machine, and the holder 17 for the container will now be discussed in greater detail in reference to FIG. 4. Container 16 is a bottle comprised of glass, a resin such as polyethylene, a thermo-foam insulating material or other suitable material. The body of the bottle has its walls 46 extending generally longitudinally and arranged to generate a circular, square or other cross sectional shape. The wall of the bottle converges conically as indicated at 52 and terminates in a mouth 53. The bottom of the container is transverse to its wall. The mouth is defined by shaping a region 54 convex outwardly to define the mouth opening 53. A thin film of preferably plastic material 55 may be adhered to the upper edge of mouth defining annulus 54 to effect a sanitary and imperforate seal. In this example, the central longitudinal axis of the container 16 is perpendicular to the plane of the seal 55. Of course, when the nozzle is plunged down as in FIG. 4, the seal film 55 is easily penetrated and continues to form a relatively tight seal against the nozzle. The convex annular portion 54 is shaped to complement the long parallel spaced apart grooves which are defined by the curved shape of the internal margins of the holder 17. Convex portion 54 is an annular or circular portion with its margin shaped convexly in cross section but it should be understood that this region may be square or shaped other than circular. Thus, a user of the machine will insert the convex mouth end of the container into the open end of the holder 17, which is like a track, and push the container along the holder as in FIG. 3 until the container comes to a stop at which time mini-switch 48 is actuated and the machine is enabled for operation. When the filling cycle is complete, the fluid is automatically shut off, and the nozzle is retracted so that the user may withdraw the container from holder 17. At this time, there will be an opening in the film for insertion of a straw by the user or the film 55 may be peeled off and the contents of the container may be poured out. As will be explained more fully later, the machine cannot be reactivated until the filled container is withdrawn and the machine is initialized through operation of mini-switch 48 by insertion of another container.

Bottles such as 16 and other containers may also be capped off with a foil, not shown, which is crimped over and around convex annulus 54 in the manner of a crown cap seal. Thin aluminum foil is suitable since it can be easily punctured with very little force from the combination nozzle punch 29.

Figure 5:
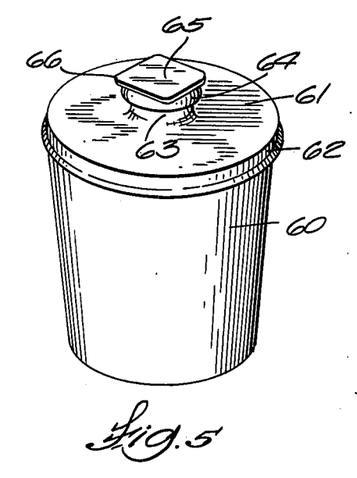
FIG. 5 is a perspective view of one type of container which is adapted for use with the dispensing machine.

Another type of container used with the new dispensing machine is shown in FIG. 5. It comprises a cup 60 which is substantially cylindrical and has a large mouth at its upper end normally covered by a cap 61. The cap may be a thin resin or other suitable material which is formed annular rim 62 that facilitates forming a press fit between cap 61 and cup 60. Cups of the type shown in FIG. 5 are especially adapted for use in making reconstituted soup and other hot beverages. Thus, the cup body is preferably formed of a good insulating material such as rigid polystyrene foam. Cap 61 is provied with a neck 63 which terminates in an integral outwardly convex annulus 64. The annulus defines an opening which is covered with an adhesive strip 65. This strip is preferably made of a non-fragmenting material such as polyethylene or adhesive backed metal foil. At least one corner 66 of strip 65 may extend radially outward from annulus 64 to enable peeling off the strip to make a larger hole if desired. In the alternative, particularly if the cup has been used to make reconstituted soup, where eating the contents of the cup with a spoon would be desired, cap 61 can be removed from the cup by grasping the neck 63 and imparting a force. It should be recognized that the convex annular portion 64 of the cap has a diameter which will permit it to slide between and finally be pinched and held by the slightly converged runners 18 and 19 of holder and guide device 17.

The electric circuitry involved in controlling the machine will now be described in reference to FIGS. 6 and 7. In the upper right region of FIG. 6, the operating coil 26' or the electroresponsive device that controls valve 21 is shown. The coil is in series with the main terminals of a triac Q3 which has a control gate 71. One end of the coil is connected to an a-c source 72. As usual, the triac is triggered to a conductive state by applying a small signal voltage to its gate 71 in which case coil 26' becomes energized from the a-c source and valve 21 opens to permit fluid injection by nozzle 29.

Another triac Q2 has its main terminals in circuit with coil 37 of solenoid actuator 35. This actuator advances and retracts combination nozzle and punch 29. Triac Q2 and coil 37 are in series and supplied from a-c source 72. Ordinarily, the a-c source voltage will be around 117 volts. Triac Q2 also has a gate terminal 73 to enable triggering the triac into a conductive state in response to a signal on its gate terminal 73.

The control circuit comprises three integrated circuit timers U2, U3 and U4 all of which are used in the monostable multivibrator mode in this circuit. In the illustrated circuit, the timers may be considered to be integrated circuit type NE555. Pin 3 of each timer in its output pin and pin 2 is its triggering pin. Typically, the output pins 3 are in a low voltage state when the timers are quiescent and they switch to a high state during the timing cycle. A timing cycle is initiated by momentarily grounding or applying a negative pulse to trigger pin 2. This results in output pins 3 going high at the beginning of a timing cycle.

Figures 6, 7:
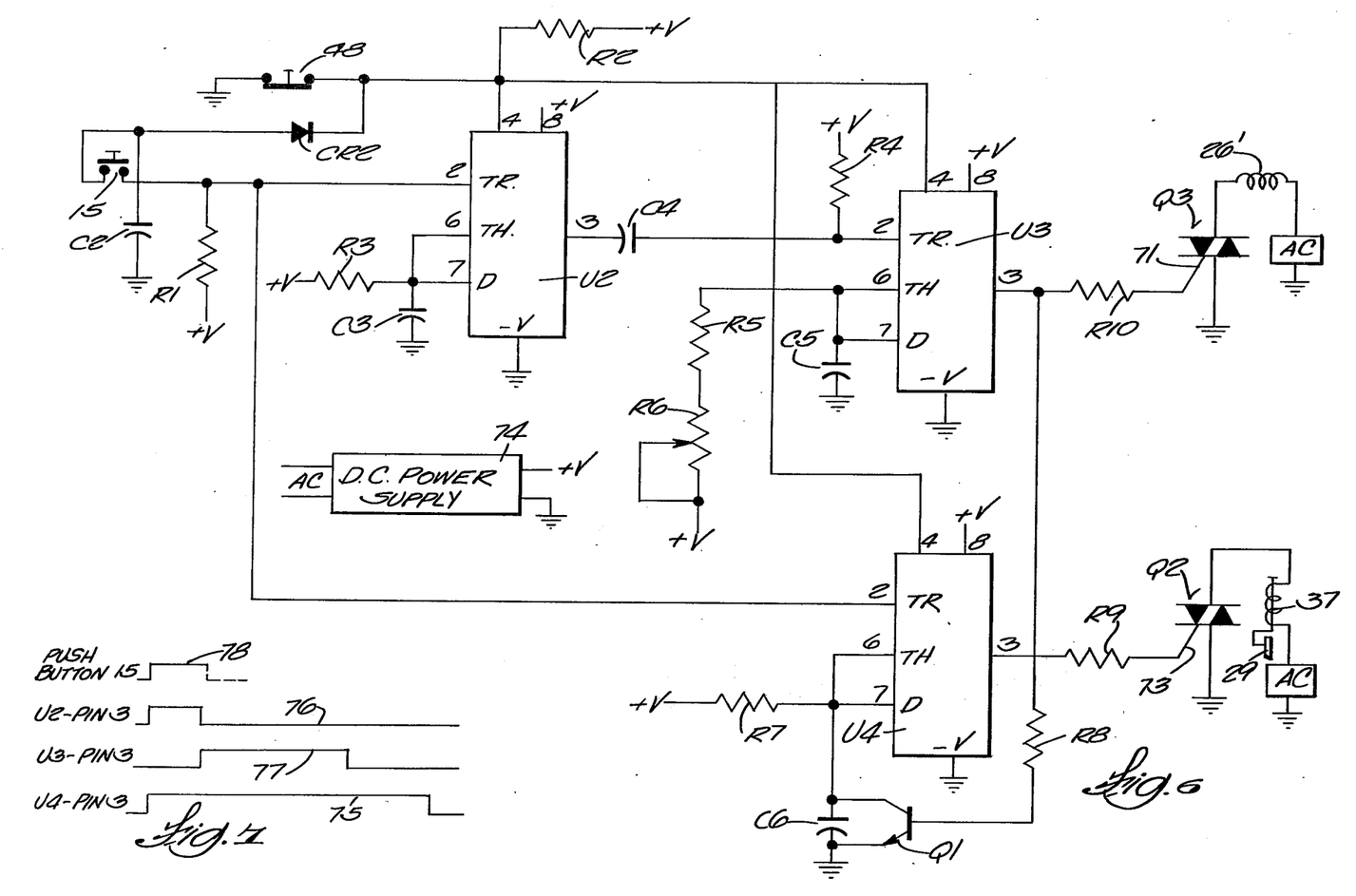
FIG. 6 is a diagram of the electric control circuitry for the machine.
FIG. 7 is a timing diagram which is useful for explaining the operating sequence of the machine.

The control circuit devices shown in FIG. 6 including the d-c power supply 74 are all mounted on circuit board 44 as in FIG. 2. The positive voltage terminal of the power supply marked +V connects to similarly marked terminals in the circuitry of FIG. 6 and to all of the pins 8 of the timers. The output voltage of the d-c power supply can be considered to be at the logic voltage level of 5 volts.

In FIG. 6, the contacts of the disabling mini-switch 48 are shown closed as they would be when the mini-switch is actuated by a container being in the proper position in holder 17. Operation of push button 15 will initiate a filling cycle if switch 48 is closed. Thus, when push button switch 15 is closed momentarily, triggering pins 2 of timers U2 and U4 are effectively connected to ground through the push button switch and a diode CR2 and mini-switch contacts 48. Thus, these pins 2 which were held high by a voltage applied through resistor R1 experience a negative going pulse in which case their output pins 3 both go high to start their timing cycles. The high going signal on output pin 3 of U4 is transmitted through R9 to the control gate 73 of triac Q2, thus turning it on. When on, coil 37 is energized at power line voltage and nozzle 29 is driven through the container cap as described earlier. Threshold sensing pin 6 of U4 and its capacitor discharge pin 7 are connected to one side of capacitor C6 whose other side is connected to ground. Charging of this capacitor from the power supply through R7 would ordinarily occur when pin 3 goes high initially but in this case, charging of C6 does not proceed to threshold voltage level. The collector to emitter circuit of a transistor Q1 is connected across C6. In this circuit, Q1 is turned on to place a short circuit across C6 to thereby delay its charging toward threshold voltage for a predetermined interval. Thus, coil 37 remains energized and nozzle 29 remains advanced from the beginning to the end of the complete operating cycle. Momentary closing of the push button is illustrated in the high going signal marked 78 in the FIG. 7 timing waveforms. The time during which pin 3 of U4 is high is illustrated by the waveform 75 in FIG. 7.

Concurrently with pin 3 of U2 going high after it is triggered simultaneously with U4, discharge of C3 through pin 7 of U2 is prohibited and C3 begins to charge through R3 toward its threshold voltage. The values of R3 and C3 are such that, in this example, threshold voltage will be reached in about 0.35 of a second. This is the amount of delay which is imposed before valve 21 may be operated to permit fluid flow. The delay assures that the container is in place and the nozzle has perforated it before fluid can begin to flow.

At the end of the 0.35 second delay period, U2 times out and its output pin 3 switches to a low state. This low or negative going signal is coupled through a capacitor C4 to the triggering pin 2 of U3, thus causing its output pin to go high. Upon this event, the high going signal is coupled through R10 to triac Q3 and the filler valve opens. At the same time, the high signal is coupled through R8 to the base of Q1 thus turning it on to maintain C6 in a discharged state for a predetermined time so that U4 can not time out and retract nozzle 29 when filling is under way.

The interval during which output pin 3 of U3 is maintained high depends on the values of C5 and charging resistors R5 and R6. R6 is a variable resistor which permits adjusting or setting the time interval of U3 in accordance with the time required to fill a container or series of containers having the same volume. In other words, the fluid volume permitted is measured or controlled on the basis of flow time. If fluid at a constant pressure is available at the input of valve 21, it will deliver the same quantity from its output during constant repeatable time intervals. Adjustable resistor R6 permits setting the on time of timer U3 and, hence, the fill time. For the sake of illustration, we can assume that the values of R5 and R6 permit a timing range of 0.5 second to 14 seconds. In this example, assume that U3 may time out in 0.7 second which is the filling time after which its pin 3 will go low to cause triac Q3 to turn off. U3 has its triggering pin held normally by a voltage applied through R4 from the supply. The timing waveform during which pin 3 of U2 is high is marked 76 in FIG. 7 and the waveform indicating when pin 3 of U3 is high is marked 77.

As indicated, when pin 3 of U3 goes low to terminate filling, the base of Q1 is no longer forward biased in which case transistor Q1 turns off. This allows C6 to charge toward threshold level. When threshold level is reached, it is sensed at pin 6 of U4 which responds by causing its output pin 3 to go low, thus removing the triggering signal from Q2. This turns off triac Q2 and de-energizes coils 37, allowing the combination nozzle-punch 29 to retract. By this time, however, the fluid has been turned off so the container may be withdrawn from the machine by the user. In this example, the values of R7 and C6 may be considered to be such that they keep pin 3 high for about 0.73 second after filling terminates. The fact that the punch timer U4 has a high output during the entire filling cycle is indicated by the waveforms 75 in FIG. 7.

In FIG. 6, there is a capacitor C2 in the upper left region which charges when push button 15 is closed. This is a safety interlock which prevents a bottle or container from being overfilled by running a second time for the same filled container. The disable switch discharges C2 through CR2, thus allowing the timers to trigger again for the next operation.

Now that achievement of a desired and safe operating sequence has been illustrated as being accomplished with a particular electric timing circuit, those skilled in the art will appreciate that other circuits may be devised for achieving essentially the same results.

Cyclic operation of the dispenser may be obtained by using a valve under the control of a multiple-state mechanical timer, not shown. Timers are available which, after they are initiated or triggered, effectuate a delay interval and then open a valve which provides time for the container to be properly positioned in the dispenser before fluid is injected through the nozzle which is supplied from the valve. These timers are also adapted for maintaining the flow through a valve for a settable interval so that the volume of fluid supplied to a container is controlled by the time the fluid is allowed to flow. These timers further feature a delay which allows for retraction of the nozzle before the container can be withdrawn from the dispenser.

Figures 8, 10:
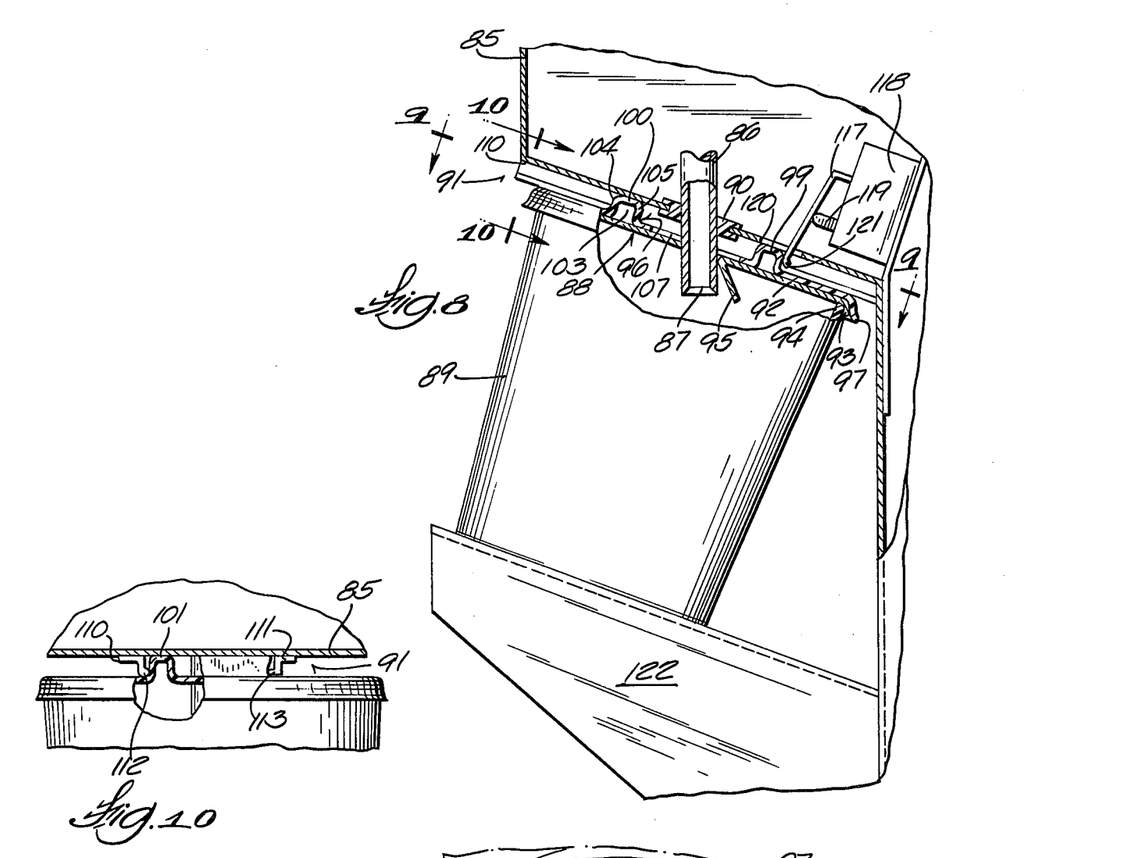
FIG. 8 is a fragmentary elevation, partly in section, of an alternative embodiment of a container cover and an alternative type of holder for gripping the container cover.
FIG. 10 is a fragmentary partial section as viewed in the direction of the arrows 10—10 in FIG. 1.
Figure 9:
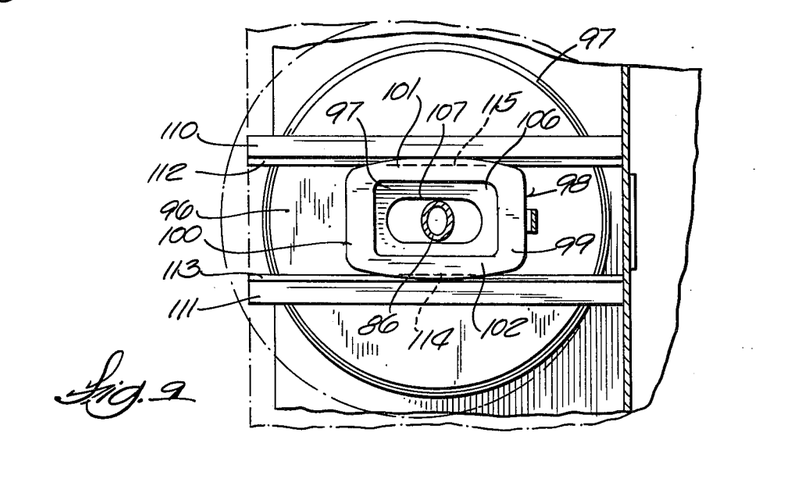
FIG. 9 is a plan view, partly in section, as viewed in the direction of the arrows 9—9 in FIG. 8, showing a container cover engaged by a holder.

What is perceived as the best mode for implementing the new features of the dispenser is illustrated in the FIGS. 8-10 embodiment. The embodiment depicted in FIG. 8 has a housing 85 which corresponds substantially with housing 12 in the previously described embodiment. The fluid flow control devices in the FIG. 8 embodiment may be similar to those which have been discussed in connection with the other embodiments so they are not reproduced in FIG. 8. This embodiment does use a tubular nozzle 86 which is subject to being advanced and retracted on a vertical line as in the previous case. Nozzle 86 terminates at its lower end in a beveled perimetral edge 87 which is sharp enough to easily penetrate the cover assembly such as the one marked 88 of a container such as the cup 89. The nozzle 86 is shown in its lowermost position in FIG. 8 where it would be during the time that fluid is being injected into cup 89. After nozzle 86 is retracted upwardly, cup 89 is free to be withdrawn from the dispenser. Note that in the bottom of housing 85 there is a flexible seal 90 which fits closely to the periphery of the tubular nozzle 86 and assures that liquid cannot be splashed from the cup back into the housing.

In the FIGS. 8-10 embodiment, the cup holder is generally designated by the reference numeral 91. This holder is designed for engaging a cup 89 by means of its lid or cover 88 which has means for being engaged by the holder. The cup cover assembly 88 and the holder 91 will now be described in detail.

First of all, we may note that the cup 89 is preferably made of a thermo-foam material which is rigid, lightweight but conducts heat very poorly so that a user experiences no discomfort when handling a cup that is occupied by hot fluid. The cups used in the dispenser may be made of other less rigid materials which conduct heat freely where filling with cold fluid is contemplated.

In this embodiment, the cover assembly 88 is made in two parts. The lower part consists of a thin metal foil 92 which is crimped at its circumferential margin 93 and adhesive is preferably used at the interface of bent down margin 93 of the cover and the lip edge 94 of the cup to further assure that the foil cover will remain adhered to the cup body 89. Initially, that is, after manufacture and after the solids are inserted in the cup 89 which are to be mixed with water injected with nozzle 86, the foil 92 is unperforated. When the nozzle 86 is driven downwardly for its sharpened tip 87 to puncture the foil, a flap 95 is formed which is not severed from the flat foil area 92 so it cannot drop into the contents of cup 89.

Superimposed on the foil cover 92 is a thin, preferably plastic lid or cover part 96. This cover makes a press fit on foil cover 92 by reason of the margins 97 of cover 96 being bent downwardly over the margin 93 of the foil cover.

A plan view of cover 96 appears in FIG. 9. The cover 96 is comprised of a thin sheet of plastic material such as rigid polyethylene on the order of 0.010 of an inch thick. Any suitable plastic material may be used for making the cover although it should have properties which permit it to be shaped by vacuum forming which is one of the merits of the new cover 96. As can be seen in FIG. 9 particularly well, cover 96 has an upwardly extending oblong protuberance or ridge 98 which has a front end 100, a rear end 99 and sides 101 and 102. Ridge 98, particularly its ends 99 and 100, can be seen in FIG. 8 where it is evident that the ridge rises from the plane of the cover. In this embodiment, the height of the ends 99 and 100 of the oblong ridge have the same height as the sides 101 and 102. As can be seen in FIG. 8, the interior of the ridge 98 is hollow as indicated by the reference numeral 103. This makes the ridge resilient when pressure is exerted on its opposite vertical sides 104 and 105. As can be seen in FIG. 9, upstanding ridge 98 defines or bounds a central recess 106 in the bottom of which there is an oblong perforation 107. An oblong portion of the underlying foil 92 is visible through perforation 107. The nozzle 86 plunges through this perforation as it penetrates foil 92 but it does not have to rupture the more rigid plastic material out of which the top cover 96 is made. Recess 106 provides a means for catching any fluid that may splash out and the perforation 107 permits the fluid, if any is present, to be drained back into the cup. Holder 91 runners 110 and 111, as is evident in FIG. 10, have an essentially z-shaped cross section. These runners are fastened to the bottom of housing 85. As can be seen in FIG. 9, the runners are in substantial parallelism but they converge slightly toward each other from the left to the right in this figure to achieve a wedging action when the upstanding ridge 98 of the cover is in between the runners. Runner 110 has a rounded edge 112 which extends toward a similarly rounded edge 113 on runner 111. When the oblong ridge 98 is pushed in between the runners 110 and 111 from their mouth end at the left in FIG. 9, the rounded edges 112 and 113 indent the size of the ridge as evidenced by the dotted lines 114 and 115 in FIG. 9. These indentations 114 and 115 prevent the covered cup from falling away from the runners.

Of course, the ridge or upstanding protuberance 98 may have other configurations but, in any case, it is desirable to have the ridge formed of a deformable material which can be indented reasonably easily when the cover is pushed between the runners by the user. As stated, thin polyethylene permits achievement of this purpose because of its resiliency and, in addition, it can be vacuum formed easily. The use of polyethylene is by way of illustration and not limitation, for other plastics having the above noted properties could also be used.

When the cover is inserted in the dispenser as in FIG. 8 the back portion 99 of the upstanding ridge 98 strikes the operating lever 117 of the fill cycle initiating miniswitch 118. When lever 117 is actuated, detent 119 plunges in to close switch 118. As in the case of the previously discussed embodiment, when the cup 89 with its cover intact is withdrawn from between runners 110 and 111 of the holder, switch 118 is actuated again and the control system is placed in its initial state in readiness for its next use. The tip 121 of operating lever 117 extends through a hole 120 in the bottom of housing 85 so the tip is barely exposed between runners 110 and 111 to minimize the chance of unauthorized or accidental operation of the switch.

In the FIG. 8 embodiment, a further support 122 is provided for cup 89 during filling. Means, not shown, are provided for shifting support 122 upwardly or downwardly to enable restricting the dispenser to operation with a cup of a particular height. The measured quantity of fluid delivered by the dispenser during each filling cycle is coordinated with the cup size which the dispenser is adapted to accept. Support 122 assures that the cup cannot fall away from its cover assembly during filling which is a desirable safety feature in cases where hot fluid is being dispensed.

It should be noted that in the FIGS. 8–10 embodiment, the axis of the nozzle 86 is at an angle with respect to the axis of cup 89 so that the fluid injected into the cup will strike its sides and cause turbulent mixing as in the case of the previously described embodiment.

Although embodiments of the invention have been described in considerable detail, such description in intended to be illustrative rather than limiting, for the invention may be variously embodied and is to be limited only by interpretation of the claims which follow.

I claim:

1. Apparatus for dispensing fluid into a material in a container for mixing with the contents thereof, comprising:
   a valve having input means for pressurized fluid and having output means,
   means comprising a punch and a nozzle, said nozzle having input means and having output means for projecting a stream of fluid in a predetermined path,
   flexible tubular means for coupling the output means of said valve with the input means of said nozzle,
   first means for advancing and retracting said punch and nozzle relative to a container,
   holder means for holding a container in a position for being entered by said punch and nozzle output means when said nozzle is advanced, said holder means comprising elements disposed on opposite sides of the line of travel of said punch and nozzle for receiving and engaging a part of said container between them and for holding said container at an angle relative to said predetermined path of said fluid for projected fluid to deflect from an inner surface of said container in the direction of another inner surface thereof to thereby produce a turbulent circulating motion in said fluid for enhancing mixing with the contents of the container.

2. The apparatus as in claim 1 wherein said punch and nozzle means are unitary and comprised of a tube, the output end of said tube being cut at a bias to define a pointed end which serves as said punch.

3. The apparatus as in claim 1 wherein:
   said means for advancing and retracting said punch and nozzle and said means for opening and closing said valve are electroresponsive means, respectively,
   electric circuit means for controlling said electroresponsive means to effect a predetermined operational sequence when a container is in a proper position for being filled, said sequence being characterized by advancing said punch and nozzle means into said container, effecting a short time delay, opening of said valve for a predetermined time, closing said valve at the end of said time, effecting a short time delay and finally retracting said punch and nozzle means.

4. The apparatus as in claim 3 wherein the pressure of said fluid supplied to the input means of said valve is constant and the volume of fluid admitted to said container is determined by said predetermined time during which said valve is open.

5. The apparatus as in claim 1 including container means especially adapted to cooperate with said holder means, said elements of holder means comprising elongated means defining spaced apart parallel grooves, said container means having a mouth defined by a convex portion extending therefrom having a cross sectional shape substantially complementary to the shape of said grooves to enable said portion to fit into and be held by said grooves to thereby achieve holding of said container during filling.

6. The container as in claim 5 including:

a thin piece of material fastened to said container in such manner as to cap said mouth, said piece of material being disposed in alignment with said nozzle and punch means when said container is in position for being filled such that said nozzle and punch may perforate said material upon being advanced.

7. The apparatus as in claim 1 including container means especially adapted to cooperate with said holder means, said elements of holder means comprising elongated means defining spaced apart parallel grooves, said container means comprising a cup composed of heat insulating material and a cover for enclosing said cup, said cover having a hollow extension including a mouth defined by a portion extending convexly therefrom and having a cross sectional shape substantially complementary to the shape of said grooves to enable said portion to fit into and be held by said grooves to thereby achieve holding of said container during filling.

8. The container as in claim 7 including:

a thin piece of material fastened to said container in such manner as to cap said mouth, said piece of material being disposed in alignment with said nozzle and punch means when said container is in position for being filled such that said nozzle and punch may perforate said material upon being advanced.

9. Apparatus for dispensing fluid into a container for mixing with the contents thereof where the container has generally longitudinally extending side wall means and a bottom generally transverse to said wall means, comprising:

valve means having input means for pressurized fluid and having output means, an electroresponsive valve operator means operatively coupled with said valve means for opening and closing said valve means in response to energization and deenergization, respectively, combination punch and nozzle means having fluid input means coupled with the output means of said valve means, electroresponsive operator means operatively coupled with said combination means for advancing and retracting the same along a substantially vertical line in response to energization and deenergization, respectively, said nozzle being constructed and arranged for projecting fluid in a substantially vertical path when said valve is open, holder means for supporting a fillable container in a position for being intersected by said vertical path, said holder means including means for engaging and holding said container so its said side wall is at an angle with respect to said vertical line such that fluid projected by said nozzle when it is advanced will deflect from said wall and have circulatory motion imparted to it for enhancing mixing with the contents of said container.

10. The apparatus as in claim 9 including electric circuit means for controlling said electroresponsive means to effect a predetermined operational sequence when a container is in a position for being filled, said sequence being characterized by advancing said punch and nozzle means into said container, effecting a short time delay, opening of said valve for a predetermined time, closing said valve at the end of said time, effecting a short time delay and finally retracting said punch and nozzle means.

11. The apparatus as in claim 9 including:

first switch means operable by said container being at a predetermined position in said holder means, second manually operable switch means mounted on said apparatus, electric circuit means for controlling said electroresponsive means, said circuit means being enabled to selectively energize said electroresponsive means for advancing said combination punch and nozzle means only in response to said first and second switch means being operated in the order stated.

12. The apparatus as in claim 10 wherein in the pressure of said fluid supplied to said input means of said valve is constant and the volume of fluid admitted to said container is determined by said predetermined time during which said valve is open.

13. The apparatus as in claim 9 wherein said combination punch and nozzle means are unitary and comprised of a tube, the output end of said tube being cut at a bias to define a pointed end which serves as said punch.

14. Apparatus for dispensing fluid into a container having a cover which has a deformable upstanding element that has a predetermined width, said apparatus comprising:

a nozzle for delivery said fluid to a container, means for reciprocating said nozzle axially in a path between a retracted inactive position and an advanced fluid delivery position, first and second runners disposed, respectively, on opposite sides of said path and generally transverse to said path, said runners each having an edge that is presented toward the other and is separated from the other by a distance which is slightly less than the width of said deformable element so said runner edges will deform said element and thereby grip said container when said element is inserted between said runners.

15. The apparatus as in claim 14 wherein the space between one pair of corresponding ends of said runners constitutes a mouth for insertion of said element between said runners, said runners converging toward each other away from said mouth by a small amount for producing a wedging effect on said element as it is moved along said runners.

16. The apparatus as in claim 14 wherein said nozzle is reciprocable along a substantially vertical path and said runners are disposed at an acute angle relative to a plane to which said vertical path is substantially perpendicular to enable holding said container by means of said cover element such that said fluid will be projected onto an inner side of said container at an angle to thereby impart turbulence to said fluid during filling of said container.

17. For use with apparatus for dispensing fluid into a cup, said apparatus comprising nozzle and punch means and means for reciprocating said nozzle and punch means in a predetermined path between a retracted inactive position and an advanced position for said nozzle to admit fluid into said cup, valve means operable to supply fluid to said nozzle, and spaced apart runners disposed generally transversely to the path of said nozzle and punch means on respectively opposed sides thereof:

cover means for said cup, said cover means having a top surface and protuberance extending from said surface, said protuberance being compressible and sufficiently wide for being engaged compressively by said opposed runners when said protuberance is inserted between said runners to thereby secure said cup in a position for said cover to be perforated by and for said fluid to be admitted to said cup by said nozzle and punch means.

18. The cover means as in claim 17 wherein said protuberance is comprised of end portions and said portions protruding from said top surface to form the walls of a recess surrounding a portion of said top surface, said portion having an opening therein for admitting said nozzle and punch means.

19. The cover means as in claim 17 wherein said protuberance is hollow and said protuberance and cover are comprised of a thin layer of plastic material.

20. The cover means as in claim 17 wherein said cover means comprises two parts, one of said parts comprising first sheet material serving as an inner cover that is penetrable by said punch and nozzle means for sealingly engaging and closing said cup, the other of said parts comprising a plastic second sheet material superimposed on said first sheet material and serving as an outer cover for said cup, said protuberance extending from said outer cover and said outer cover having an opening for enabling said nozzle to penetrate said first sheet in line with said opening.

21. The cover means as in claim 20 wherein said first sheet material is metallic foil.

22. For use with apparatus for dispensing fluid into a cup, said apparatus comprising nozzle and punch means and means for reciprocating said nozzle and punch means in a predetermined path between a retracted inactive position and an advanced position for said nozzle to admit fluid into said cup, valve means operable to supply fluid to said nozzle, and spaced apart runners disposed generally transversely to the path of said nozzle and punch means on respectively opposed sides thereof:

cover means for said cup comprising a thin first sheet of plastic material for extending over the top opening of said cup and having a margin for engaging at the rim of said cup, a hollow protuberance formed integrally from said sheet material cover for protruding away from the interior of said cup, said sheet material being thin enough for said protuberance to be yieldable and wide enough to be subject to compressive engagement by said runners when inserted between said runners for positioning said cup to be penetrated by said nozzle and punch means.

23. The cover means as in claim 22 wherein said plastic sheet material has a thickness and characteristics suitable for vacuum forming of said cover.

24. The cover means as in claim 22 wherein said protuberance has spaced apart side walls formed of said sheet material and said sheet material is continuous between said side walls, said side walls being subject to indentation by said runners when said protuberance is inserted between them.

25. The cover means as in claim 22 comprising a second sheet of material for extending over the top opening of said cup while underlying said first material and having a margin for engaging the rim of said cup.

26. For use with apparatus for dispensing fluid into a cup, said apparatus comprising nozzle and punch means and means for reciprocating said nozzle and punch means in a predetermined path between a retracted inactive position and an advanced position for said nozzle to admit fluid into said cup, valve means operable to supply fluid to said nozzle and spaced apart runners disposed generally transversely to the path of said nozzle and punch means on respectively opposed sides thereof:

cover means for said cup comprising a first sheet material overlaying a second sheet material, said second sheet material having a margin which is sealingly engageable with the rim of said cup and said first sheet material having a margin which is engageable with the margin of said first sheet material, said second sheet material having a resilient upstanding ridge means protruding from it on a side opposite of said first sheet material, said ridge means being sized for being received between said runners to be compressively engaged thereby for securing said cup in a position to be filled.

27. The cover means as in claim 26 wherein said ridge means comprises upstanding spaced apart side walls formed integrally from said first sheet material and said side walls being resilient for undergoing indentation when inserted between said runners.

28. The cover means as in claim 26 wherein said ridge means is formed in a pattern surrounding a portion of said first sheet material, said portion having an opening therein which is normally closed by said underlying second sheet material, said opening being for enabling said punch and nozzle means to penetrate said second sheet material.

* * * * *

UNITED STATES PATENT AND TRADEMARK OFFICE
CERTIFICATE OF CORRECTION

PATENT NO. : 4,164,964
DATED : August 21, 1979
INVENTOR(S) : Paul J. Daniels

It is certified that error appears in the above—identified patent and that said Letters Patent is hereby corrected as shown below:

Claim 18, column 13, line 16, "said" should read -- side --.

*Signed and Sealed this*

*Twenty-seventh* Day of *November 1979*

[SEAL]

*Attest:*

RUTH C. MASON
*Attesting Officer*

LUTRELLE F. PARKER
*Acting Commissioner of Patents and Trademarks*